United States Patent
Belz et al.

(10) Patent No.: US 8,359,356 B2
(45) Date of Patent: Jan. 22, 2013

(54) PRESENTING CALENDAR EVENTS WITH PRESENCE INFORMATION

(75) Inventors: Steven M. Belz, Cedar Park, TX (US); Marc Sullivan, Austin, TX (US); James Pratt, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 641 days.

(21) Appl. No.: 12/143,178

(22) Filed: Jun. 20, 2008

(65) Prior Publication Data

US 2009/0319607 A1    Dec. 24, 2009

(51) Int. Cl.
*G06F 15/16* (2006.01)
(52) U.S. Cl. ........ 709/206; 709/204; 709/217; 709/218; 709/219
(58) Field of Classification Search ................... 709/204, 709/206, 217–219, 227–229
See application file for complete search history.

(56) References Cited

U.S. PATENT DOCUMENTS

| | | | | |
|---|---|---|---|---|
| 2005/0267975 | A1* | 12/2005 | Qureshi et al. | 709/229 |
| 2007/0073889 | A1* | 3/2007 | Morris | 709/229 |
| 2007/0217585 | A1 | 9/2007 | Wollmershauser et al. | |
| 2007/0233852 | A1 | 10/2007 | Jachner | |
| 2008/0133580 | A1* | 6/2008 | Wanless et al. | 707/102 |
| 2009/0182821 | A1* | 7/2009 | Allen et al. | 709/206 |
| 2010/0022225 | A1* | 1/2010 | Benger et al. | 455/414.1 |

FOREIGN PATENT DOCUMENTS

EP    1801743 A1    6/2007

OTHER PUBLICATIONS

A. Niemi. "Session Initiation Protocol Event Packages for Calendaring". Network Working Group. "draft-niemi-sipping-cal-events-01". <http://tools.ietf.org/html/draft-niemi-sipping-cal-events-01>. Published: Mar. 6, 2006.*
Silverberg et al. "iCalendar Transport—Independent Interoperability Protocol (iTIP)—Scheduling Events, BusyTime, To-dos and Journal Entries". Network Working Group. Request for Comments: 2446. <http://www.ietf.org/rfc/rfc2446.txt>. Published: Nov. 1998.*
Small et al. "Calendar Attributes for vCard and LDAP". Network Working Group. Request for Comments: 2739. <http://www.ietf.org/rfc/rfc2739.txt>. Published: Jan. 2000.*

* cited by examiner

*Primary Examiner* — Ashok Patel
*Assistant Examiner* — Kevin Bechtel
(74) *Attorney, Agent, or Firm* — Guntin & Gust, PLC; Andrew Gust

(57) ABSTRACT

A system that incorporates teachings of the present disclosure may include, for example, a presence system having a controller to transmit to a calendar system presence information of a subscriber of the presence system for recording said presence information in a calendar event. Other embodiments are disclosed.

23 Claims, 4 Drawing Sheets

100

200

US 8,359,356 B2

PRESENTING CALENDAR EVENTS WITH PRESENCE INFORMATION

FIELD OF THE DISCLOSURE

The present disclosure relates generally to calendar management techniques and more specifically to a system and method for presenting calendar events.

BACKGROUND

It has become commonplace for a number of users to utilize software-based calendar tools to perform time management tasks. Some calendar applications can combine calendar software with email communications. With this feature a user can submit to others an email message with an embedded calendar event invitation. Upon receiving the email, the calendar application of a recipient of the email presents a graphical user interface describing the calendar event (e.g., an invitation to engage in a conference call) and an option to accept the invitation. If the recipient accepts the invitation, the calendar event is recorded in the recipient's calendar, and a reminder is triggered at or near a time when the calendar event is to occur.

DETAILED DESCRIPTION

One embodiment of the present disclosure entails a computer-readable storage medium having computer instructions for submitting a calendar event invitation, recording a calendar event associated with the calendar event invitation and an indication that one or more participants have accepted the calendar event invitation, receiving presence information from the one or more participants, and recording the presence information in the recorded calendar event.

Another embodiment of the present disclosure entails a computer-readable storage medium having computer instructions for receiving a calendar event invitation from a calendar system, enabling presence information sharing of a user targeted by the calendar event invitation, and transmitting to the calendar system an acceptance of the calendar event invitation and an indication that presence information sharing has been enabled.

Yet another embodiment of the present disclosure entails a method involving recording a calendar event with presence information of one or more participants identified by the calendar event.

Another embodiment of the present disclosure entails a presence system having a controller to transmit to a calendar system presence information of a subscriber of the presence system for recording said presence information in a calendar event.

Figure 1:
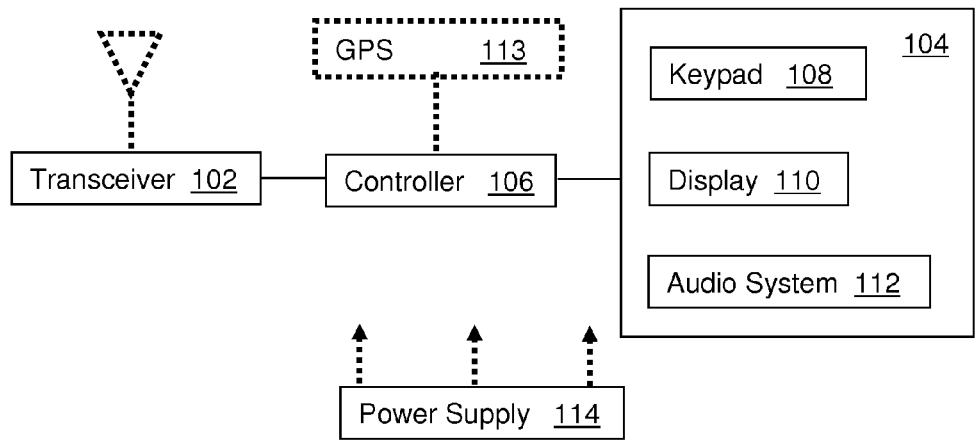
FIG. 1 depicts an illustrative embodiment of a communication device.

FIG. 1 depicts an illustrative embodiment of a communication device 100. The communication device 100 can comprise a wireline or wireless transceiver 102 (herein transceiver 102), a global positioning system (GPS) receiver 113, a user interface (UI) 104, a power supply 114, and a controller 106 for managing operations thereof. The transceiver 102 can utilize common wireless access technologies such as cellular, software defined radio (SDR) and/or Worldwide Interoperability for Microwave Access (WiMAX) technologies, among others. Cellular technologies can include, for example, Code Division Multiple Access (CDMA-1X), Universal Mobile Telecommunications System/High-Speed Downlink Packet Access (UMTS/HSDPA), Global System for Mobile Communications/General Packet Radio Service (GSM/GPRS), Time Division Multiple Access/Enhanced Data rates for GSM Evolution (TDMA/EDGE), Broadband Access Evolution Data Optimized (EV/DO), and next generation technologies as they arise. In another embodiment, the transceiver 102 can support short-range wireless access technologies such as Bluetooth, Wireless Fidelity (WiFi), or cordless technologies such as Digital Enhanced Cordless Telecommunications (DECT) or Personal Handyphone System (PHS). In yet another embodiment the transceiver 102 can support wireline technologies such as a Public Switched Telephone Network (PSTN), VoIP or Internet Protocol Multimedia Subsystem (IMS) communications.

The User Interface (UI) 104 can include a depressible or touch-sensitive keypad 108 with a navigation mechanism (e.g., a roller ball, a joy stick, or mouse) for manipulating operations of the communication device 100. The UI 104 can further include a display 110 such as monochrome or color LCD (Liquid Crystal Display) for conveying images to the end user of the communication device 100. In an embodiment where the display 110 is touch-sensitive, a portion of the keypad 108 can be presented by way of the display. The UI 104 can also include an audio system 112 that utilizes common audio technology for conveying private audio (e.g., audio heard only in the proximity of a human ear) and high audio (e.g., speakerphone for hands free operation). The audio system 112 can further include a microphone for intercepting audible signals of an end user.

The power supply 114 can utilize common power management technologies such as replaceable batteries, supply regulation technologies, and charging system technologies for supplying energy to the components of the communication device 100 to facilitate portable applications. The communication device 100 can utilize the GPS receiver 113 for tracking the whereabouts of the communication device 100. The GPS receiver 113 can also be used for providing navigation services to the user of the communication device 100. The controller 106 can utilize computing technologies such as a microprocessor and/or digital signal processor (DSP) with associated storage memory such a Flash, Read Only Memory) (ROM), Random Access Memory) (RAM), Static Random Access memory (SRAM), Dynamic Random Access Memory) (DRAM) or other storage technologies.

The communication device 100 of FIG. 1 can be representative of a computing device such as a laptop computer, a desktop computer, a server, a mobile phone (e.g., cell phone), a short-range mobility phone (e.g., a cordless or wired office or home phone), or a set-top box operatively coupled to a media communication system such as a cable TV communication system, a satellite TV communication system, or an Internet Protocol TV communication system.

Figure 2:
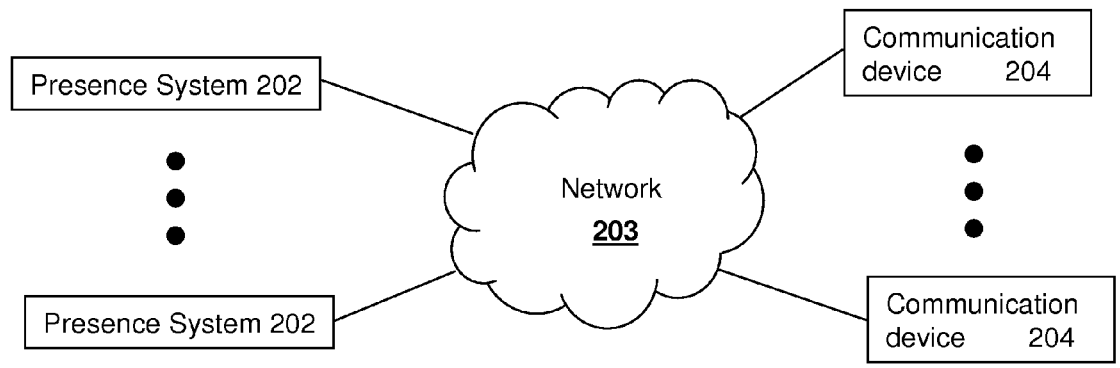
FIG. 2 depicts an illustrative embodiment of one or more presence systems communicatively coupled to one or more corresponding communication devices of FIG. 1.

FIG. 2 depicts an illustrative embodiment of one or more presence systems 202 communicatively coupled by way of a network 203 to one or more corresponding communication devices 100. The network 203 can represent a fixed line or mobile communication system such as for example a public or private portion of the Internet, a PSTN, VoIP or IMS network, a cellular network, a WiMAX network, a WiFi network, or suitable communication networks. The presence systems 202 can utilize common tracking and activity sensing technology to monitor activities of the users of the communication devices 100 and their whereabouts. The presence systems 202 can for example monitor network activities by way of network 203 to determine that a particular user is utilizing an office computer, office phone, instant messaging client on a mobile phone, and so on.

A user can thus have a number of alternative embodiments of the communication device 100. For example, a user may have a laptop computer, a desktop office computer, an office phone, a home phone, a mobile phone, and so forth, each representing an illustrative embodiment of the communication device 100. Thus by monitoring network activities emanating from one of the communication devices 100 of a user, the presence system 202 can determine by common means what activity the user is engaged in, and which communication device 100 can be targeted for establishing communications with the user with a probable level of success.

The presence system 202 can also locate the whereabouts of the user by common means such as network activity information (e.g., packets sent from office computer indicate the user is in her office), triangulation of mobile base stations, or by receiving GPS coordinates from a communication device 100 with an integrated GPS receiver 113 such as shown in FIG. 1.

Figure 3:
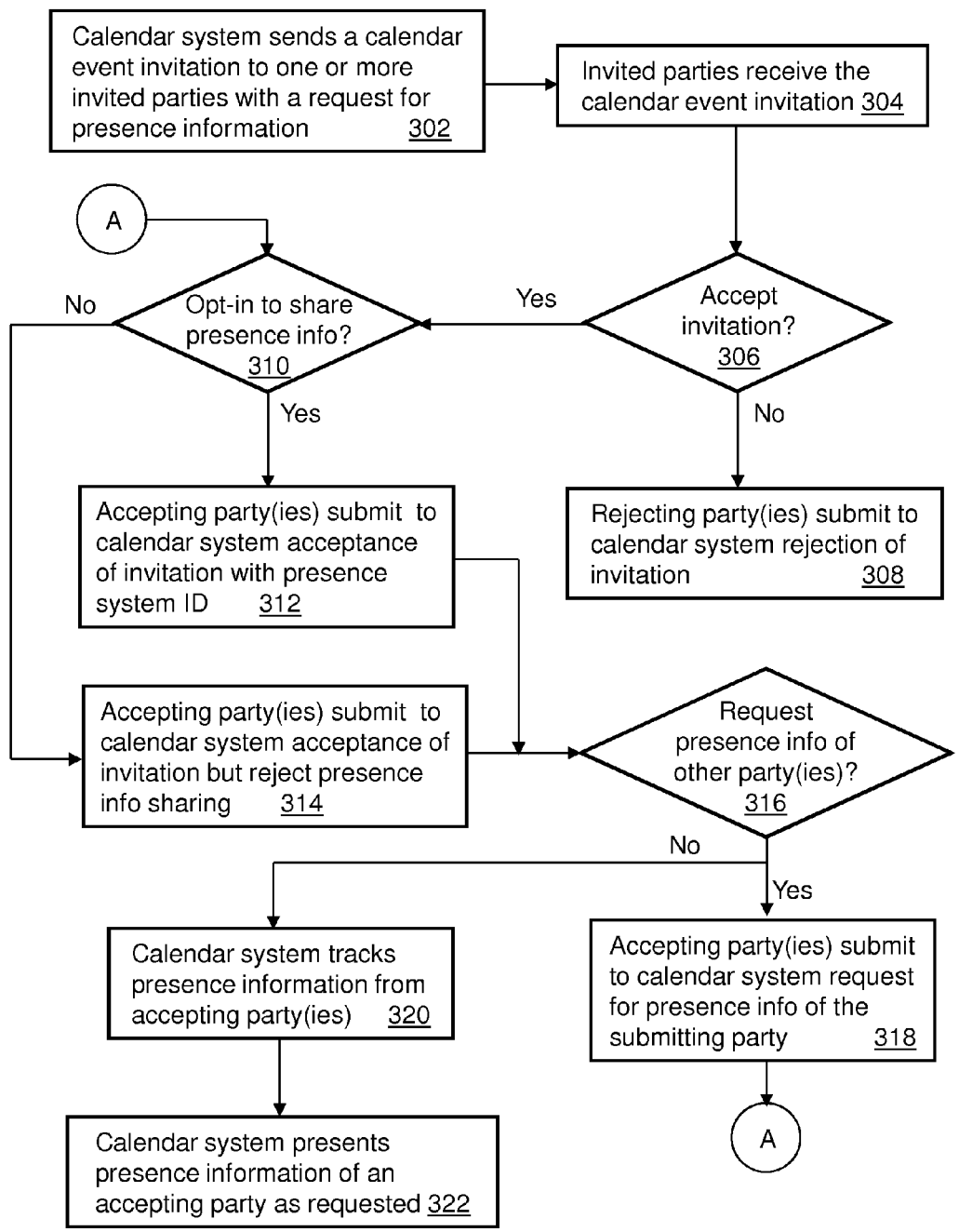
FIG. 3 depicts an illustrative method operating in the communication devices and presence systems of FIG. 2.
Figure 4:
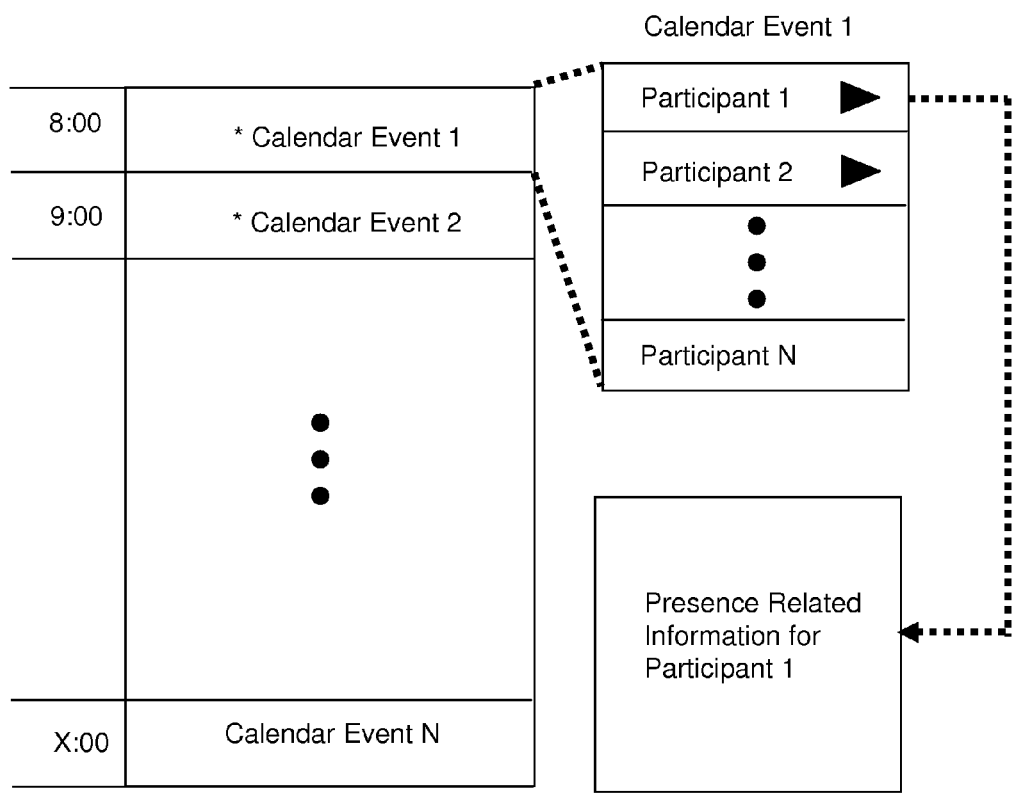
FIG. 4 depicts an illustrative embodiment of a graphical user interface representative of the method of FIG. 2.

The communication device 100 can execute a number of software-based applications including a calendar system that operates illustratively as depicted by method 300 of FIG. 3. FIG. 4 depicts an illustrative embodiment of a graphical user interface of the calendar system in accordance with method 300. Method 300 can begin with step 302 where the calendar system of a communication device 100 of an initiating party transmits a calendar event invitation by way of an email message or other suitable communication means (e.g., Short Message Service message (SMS), Multimedia Message Service message (MMS)) to one or more invited parties. The invitation can include metadata describing the calendar event (e.g., Conference call for Project X on Jul. 9, 2008) and a request for presence information for each of the invited parties. The initiating party can invoke step 302 by selecting a time slot in the calendar system operating in the communication device 100 of the initiating party, identifying the invited parties by email addresses associated therewith, and selecting a transmission request to distribute the invitation to the invited parties (e.g., selecting an email send button).

In step 304, the invited parties can receive the calendar event invitation at a corresponding communication device 100 of said parties. The invitation can be presented as a graphical user interface (GUI) prompt indicating a calendar invitation has been received. The GUI can be presented by a software application that processes email messages, and can be integrated with the calendar system operating in the communication device 100 of the invited party. The invited parties can accept or reject the invitation in step 306. If the calendar event invitation is rejected by an invited party, the communication device 100 of the invited party submits a rejection message back to the calendar system of the initiating party of step 302.

If the invited party accepts the invitation in step 306, the communication device 100 of said party proceeds to step 310 to determine if the invited party will opt-in to sharing presence information with the calendar system of the initiating party. This step can be represented by a GUI presented to the invited party that indicates the initiating party of step 302 is requesting access to the presence information of the invited party. If the invited party accepts the request to share presence information, the communication device 100 of the invited party proceeds to step 312 and submits to the calendar system of the initiating party an acceptance of the calendar event invitation and a presence system identifier (ID).

The presence system ID can represent metadata that describes how to poll the presence system 202 associated with the invited party (see FIG. 2). The metadata can include for example a uniform resource locator (URL) and authorization information such as login and password. The metadata can be used by the calendar system of the initiating party to access the presence system 202 of the invited party and track the activities, whereabouts of the invited party, and/or the most likely communication device 100 that can be targeted to establish communications with the invited party (e.g., cell phone, home phone, office phone, instant messaging client of a computer or phone, etc.). If the invited party chooses to accept the calendar event invitation, but does not opt-in to share presence information, then the communication device 100 of the invited party proceeds to step 314 and conveys this information to the calendar system of the initiating party.

After step 312 or 314, the communication device 100 of the invited party can submit a Graphical User Interface (GUI) prompt in step 316 to said party asking whether the invited party would like to request presence information from the initiating party (or other participants of the calendar event invitation). If the invited party requests presence information, the communication device 100 of said party proceeds to step 318 where it submits the request to the calendar system of the initiating party. The communication device 100 of the initiating party can inform said party of this request, and can present the initiating party the option to share presence information as previously described in step 310 and the steps that follow.

In step 320, the calendar system of the initiating party tracks presence information from the accepting parties by polling the presence system 202 with the metadata provided in step 312. In step 322 the calendar system of the initiating party presents the presence information of an accepting party as requested. FIG. 4 shows a GUI depicting how a user can visualize presence information according to step 322. In this illustration each calendar event that has presence information can be identified by a symbol such as an asterisk (*). Calendar events without the asterisk (such as calendar event N) lack presence information of the participants. When a calendar event is selected, the participants of the event can be presented as shown in FIG. 4. Participants with an arrow symbol next to their name have presence information available for review, while those without (e.g., Participant N) have no presence information.

To present presence information of one of the participants, the initiating party can select the GUI arrow element, which in turn opens a GUI with presence-related information for the selected party. The presence information can indicate the whereabouts of the participant (e.g., Participant 1 is in building N, or on road X heading North). The presence information can also indicate an estimated time of arrival to a desired location (e.g., conference room X where the meeting is to take place). The desired location can be specified by the initiating party in a location field of the calendar event invitation. Steps 320-322 can be applied to the calendar system of an invited party who has requested presence information of the initiating party (and/or other participants).

From the foregoing descriptions, it would be evident to an artisan with ordinary skill in the art that the aforementioned embodiments can be modified, reduced, or enhanced without departing from the scope and spirit of the claims described below. For example, method 300 can be adapted so that a calendar system of a participant can direct a presence system 202 to enable presence sharing with the calendar system of another participant. Additionally, a participant can direct the presence system 202 to share presence information with the calendar system of another participant for a limited time (e.g., the period of time defined by the calendar event or a period lasting a few minutes before and/or after the calendar event).

In yet another illustrative embodiment, method 300 can be adapted so that accepting a request for sharing presence information in step 310 can be determined on the basis of prior behavior between participants, preference settings, or a profile established by participants. In another illustrative embodiment, method 300 can be adapted so that the presence system 202 autonomously informs the calendar system of participants tracking presence information rather than requiring the calendar system to poll the presence system 202. In another illustrative embodiment, method 300 can be adapted so that all participants of a calendar event are bound to share presence information. This requirement can be predefined in the calendar systems of each participant.

Other suitable modifications can be applied to the present disclosure. Accordingly, the reader is directed to the claims for a fuller understanding of the breadth and scope of the present disclosure.

Figure 5:
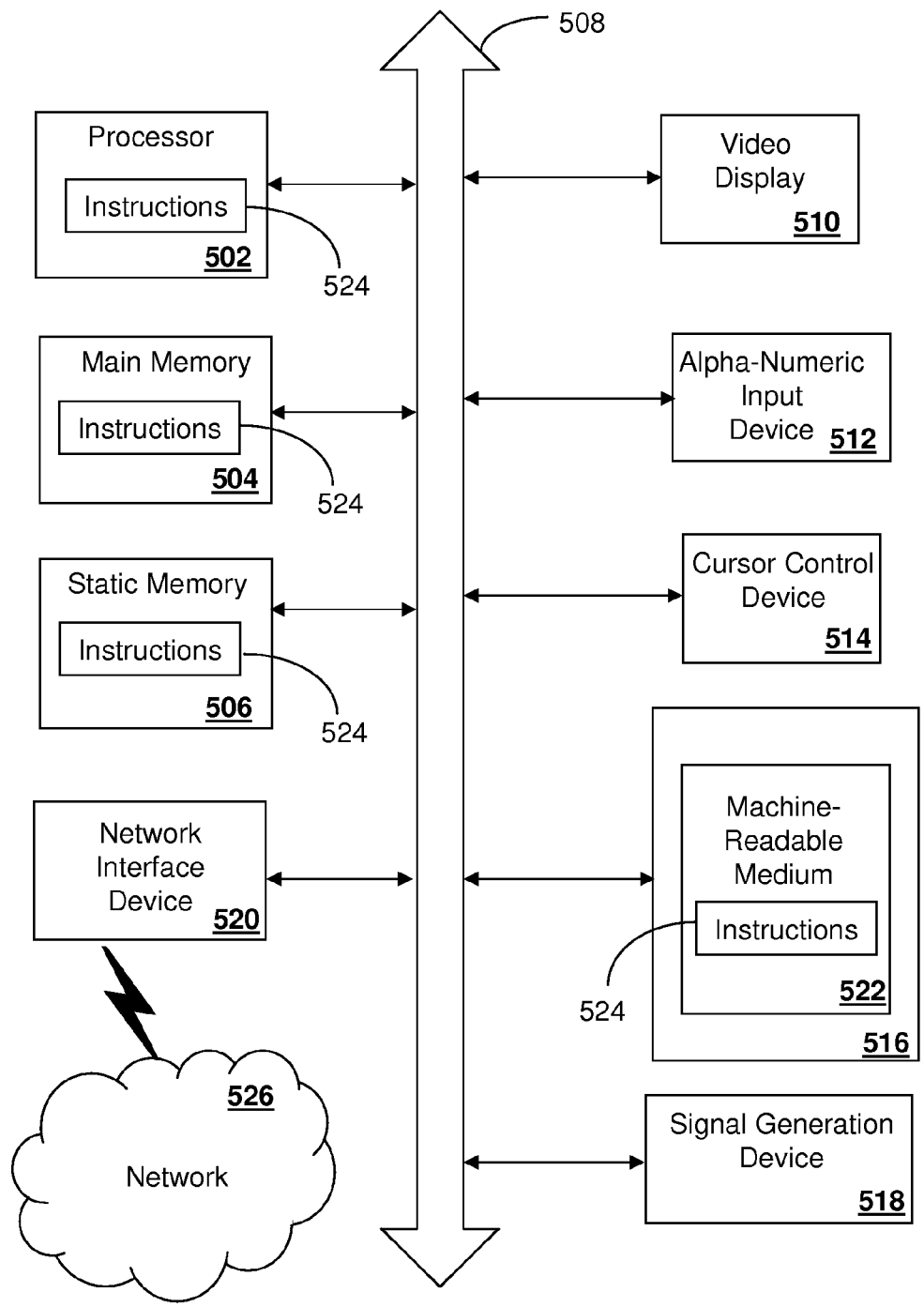
FIG. 5 depicts an illustrative diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., Transmission Control Protocol/Internet Protocol (TCP/IP), User Datagram Protocol/Internet Protocol (UDP/IP), HyperText Markup Language (HTML), Hyper Text Transfer Protocol (HTTP)) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, which when executed by a processor, causes the processor to perform operations comprising:

submitting to equipment of a participant a calendar event invitation initiated from a communication device of an initiating party;

recording a calendar event associated with the calendar event invitation and recording an indication that the participant has accepted the calendar event invitation;

receiving presence metadata from a presence system utilized by the participant responsive to receiving from the equipment of the participant user input indicating an acceptance of a request submitted by the communication device of the initiating party for presence information, the presence metadata being received by the communication device of the initiating party;

obtaining presence information for the participant from the presence system based on instructions in the presence metadata, the presence information being obtained by the communication device of the initiating party, wherein the instructions comprise an address of the presence system monitoring the participant, and authentication information to access the presence system;

recording the presence information in the recorded calendar event;

enabling a symbol for presentation to indicate that the recorded calendar event includes the presence information; and updating the presence information recorded in the calendar event responsive to detecting subsequent updates of the presence information associated with the participant.

2. The non-transitory computer-readable storage medium of claim 1, wherein the processor further performs operations comprising presenting the presence information in the recorded calendar event.

3. The non-transitory computer-readable storage medium of claim 1, wherein the presence information comprises an expected time for the participant to arrive at a desired location.

4. The non-transitory computer-readable storage medium of claim 1, wherein the presence system is accessible by the communication device of the initiating party according to the presence metadata for a limited duration.

5. The non-transitory computer-readable storage medium of claim 4, wherein the limited duration begins at a first time before or after a commencement of the calendar event, and ends at a second time before or after a conclusion of the calendar event.

6. The non-transitory computer-readable storage medium of claim 1, wherein the processor further performs operations comprising:

submitting the calendar event invitation to equipment of other participants, wherein other presence information is supplied by other presence systems monitoring the other participants; and recording the other presence information in the recorded calendar event.

7. The non-transitory computer-readable storage medium of claim 1, wherein the processor further performs operations comprising directing a second presence system for which the initiating party is a subscriber to transmit second presence information associated with the initiating party to a calendar system accessible by the equipment of the participant.

8. The non-transitory computer-readable storage medium of claim 7, wherein the processor further performs operations comprising directing the second presence system to limit a duration of transmissions of the second presence information to the calendar system accessible by the equipment of the participant.

9. The non-transitory computer-readable storage medium of claim 1, wherein the processor further performs operations comprising transmitting, by the communication device, to the equipment of the participant the request for the presence information.

10. A non-transitory computer-readable storage medium, comprising computer instructions, which when executed by a processor, cause the processor to perform operations comprising:
receiving a calendar event invitation from a calendar system accessible to a communication device of an initiating party, wherein the calendar system recorded the event;
detecting a first request from the communication device of the initiating party for access to presence information, the first request directed to a device of a user targeted by the calendar event invitation;
providing presence metadata from the device of the user targeted by the calendar event invitation to the communication device of the initiating party responsive to receiving user input from the device of the user targeted by the calendar event invitation indicating an acceptance of the first request to provide access to presence information, the presence metadata being utilized to obtain presence information associated with the user from a presence system based on instructions in the presence metadata, the presence information being obtained by the communication device of the initiating party and recorded in the calendar event, the instructions comprising an address of the presence system monitoring the user, and authentication information to access the presence system enabling presence information sharing of the user targeted by the calendar event invitation, wherein the presence information recorded in the calendar event of the initiating party is updated responsive to detecting subsequent updates of the presence information associated with the device of the user targeted by the calendar event invitation; and
transmitting to the calendar system an acceptance of the calendar event invitation and an indication that the presence information sharing has been enabled, thereby causing the calendar system to enable a symbol for presentation to indicate that the calendar event includes the presence information.

11. The non-transitory computer-readable storage medium of claim 10, wherein the enabling of presence information sharing comprises directing the presence system to enable presence information sharing with the calendar system.

12. The non-transitory computer-readable storage medium of claim 10, wherein the presence information comprises at least one of a likelihood of communicating with the user by way of at least one of the one or more communication devices, an expected time for the user to arrive at a desired location, or both.

13. The non-transitory computer-readable storage medium of claim 10, wherein the processor further performs operations comprising limiting a duration for sharing presence information of the user with the calendar system.

14. The non-transitory computer-readable storage medium of claim 10, wherein the enabling of presence information sharing comprises enabling presence information sharing with the calendar system responsive to receiving a second request from the calendar system.

15. The non-transitory computer-readable storage medium of claim 10, wherein the enabling of presence information sharing comprises enabling presence information sharing with the calendar system responsive to detecting a pattern of behavior of the user.

16. The non-transitory computer-readable storage medium of claim 15, wherein the pattern corresponds to at least one of a prior sharing of presence information of the user with the calendar system, a preference setting established by the user, a profile of the user, or a combination thereof.

17. The non-transitory computer-readable storage medium of claim 10, wherein the processor further performs operations comprising:
recording the calendar event;
submitting a second request to receive second presence information associated with the initiating party;
receiving the requested second presence information of the initiating party; and
recording the requested second presence information in the calendar event.

18. The non-transitory computer-readable storage medium of claim 17, wherein the processor further performs operations comprising for updating the second presence information recorded in the calendar event responsive to detecting subsequent updates of the second presence information associated with the initiating party.

19. A method, comprising:
receiving, by a calendar system, presence information of participants accepting a calendar event;
recording, by the calendar system, the calendar event with the presence information of participants identified by the calendar event, wherein the presence information is obtained by a communication device of an initiating party based on presence metadata provided by equipment of the participants to provide the communication device of the initiating party access to the presence information, wherein the presence metadata is provided upon acceptance by equipment of the participants of a received party request from the communication device of the initiating party, wherein the presence metadata comprises instructions for accessing presence system associated with the participants, and wherein the instructions comprise an address of the presence system monitoring the participants and authentication information to access the presence system;
updating the presence information recorded in the calendar event responsive to detecting subsequent updates of the presence information associated with the participants identified by the calendar event; and
enabling a symbol for presentation to indicate that the recorded calendar event includes the presence information.

20. The method of claim 19, wherein the presence information comprises at least one of a likelihood of communicating with the one or more participants by way of their corresponding one or more communication devices, an expected time for each of the one or more participants to arrive at a desired location, or both.

21. A presence system, comprising:
a communication interface for receiving a request for presence information from a communication device of an initiating party having access to a calendar system;
a memory storing computer instructions; and
a controller coupled to the memory, and the communication interface, wherein responsive to executing the computer instructions, the controller performs operations comprising:
receiving a request for presence information of a subscriber and authentication information from the communication device of the initiating party;
transmitting to the calendar system the presence information of the subscriber of the presence system for recording said presence information in a calendar event responsive to validation of the authentication, wherein the request for the presence information is based on presence metadata received by the communication device of the initiating party from a communication device of the subscriber sent in response to user input initiated by the subscriber representing an acceptance of the calendar event, wherein the presence metadata comprises instructions for polling the presence system, wherein the instructions comprise an address of the presence system monitoring the subscriber, and authentication information to access the presence system, and wherein the presence information transmitted to the calendar system causes the calendar system to enable a symbol for presentation to indicate that the calendar event includes the presence information; and transmitting to the calendar system updated presence information of the subscriber of the presence system, wherein the calendar system records the updated the presence information in the calendar event.

22. The presence system of claim 21, wherein the presence information comprises an expected time for the subscriber to arrive at a desired location.

23. The presence system of claim 21, wherein the presence information is shared with the calendar system for a duration specified by the subscriber, and wherein transmitting to the calendar system the presence information comprises transmitting the presence information to the calendar system responsive to receiving a request from the calendar system.

\* \* \* \* \*